Oct. 29, 1940.  R. G. TURNER  2,219,794
THREAD SEPARATOR FOR LOOMS
Filed Sept. 11, 1939
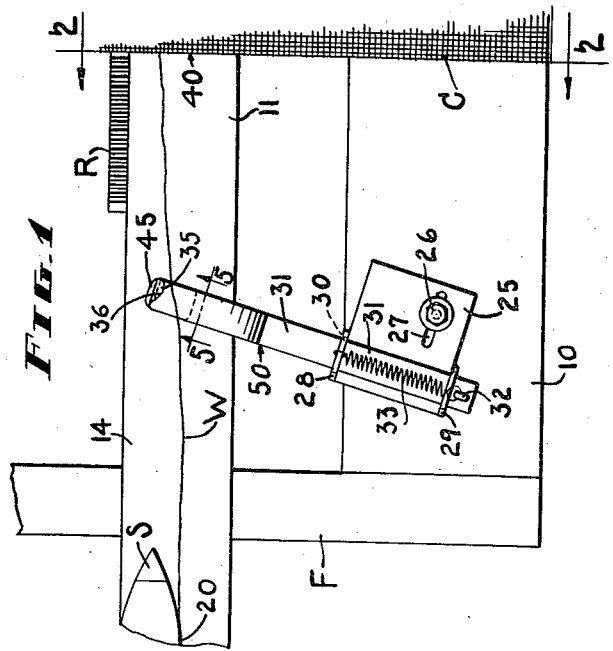
INVENTOR
RICHARD G TURNER
ATTORNEY

Patented Oct. 29, 1940

2,219,794

UNITED STATES PATENT OFFICE 2,219,794

THREAD SEPARATOR FOR LOOMS

Richard G. Turner, Worcester, Mass., assignor to Crompton & Knowles Loom Works, Worcester, Mass., a corporation of Massachusetts Application September 11, 1939, Serial No. 294,314

10 Claims. (Cl. 139—116)

This invention relates to improvements in thread separators for looms and it is the general object of the invention to provide improved means for preventing entanglement of the threads at the drop box end of the loom.

In shifting shuttle box looms the idle shuttles are either above or below the shuttle race and have thread ends which extend to the selvage. These thread ends are likely to become entangled with the active shuttle, particularly when fine filling is being woven. The shuttle boxes shift while the lay is in the forward part of its stroke and the thread is fed from a shuttle eye in the front wall of the shuttle. As the lay approaches front center on a box shifting beat the thread is in advance of the reed and is also being moved vertically by the box shift with respect to the shuttle race. It is an important object of my present invention to provide a hook mounted on a stationary part of the loom such as the breast beam and lying close to the shuttle race to pass under the thread as the shuttle approaches front center. During the immediately ensuing backward motion of the lay the hook will hold the thread in a position forward with respect to the path of the active shuttle. When the shuttle attached to the thread is again moved to active position and is picked into the shed the thread will be able to clear itself of the hook because of the shape of the latter.

Occasionally the pick driving a shuttle toward the drop boxes will be weak with the result that the shuttle is slow in arriving at the box end of the loom. Under these conditions the forward motion of the lay may force the shuttle against the hook and it is a further object of my present invention to provide a yieldable mounting for the hook and also form the latter with a guard which will prevent actual contact between the shuttle and the hook proper. It will be understood that the fine character of yarns to which my invention more particularly relates requires that the hook be given a high degree of finish in the manufacturing operation and the guard is for the purpose of preventing the shuttle from damaging the hook and its finish.

It is a further object of my invention to mount the hooks so that the edge thereof near the shuttle boxes will be inclined rearwardly and toward the center of the loom to assist the thread in clearing itself from the hook should it lie under the hook. The mounting also permits adjustments of the hook toward and from the adjacent selvage.

With these and other objects in view which will appear as the description proceeds, my invention resides in the combination and arrangement of parts hereinafter described.

In the accompanying drawing, wherein a convenient embodiment of my invention is set forth, Fig. 1 is a plan view of the drop box end of the forward part of the loom having my invention applied thereto, the lay being forward, Fig. 2 is a vertical section on line 2—2 of Fig. 1 showing the lay on front center position and with the boxes shifting upwardly, Fig. 3 is a view similar to Fig. 2 but with a misplaced shuttle in engagement with the hook and moving the latter forwardly, Fig. 4 is a view similar to Fig. 1 but with the lay moving rearwardly, and Fig. 5 is a detail vertical section on line 5—5, Fig. 1, on an enlarged scale.

Referring to the drawing, I have shown a loom frame F having a breast beam 10 and a lay 11 which reciprocates toward and from the breast beam in the usual manner. The lay is provided at one end with a gang G of shifting shuttle boxes having in the present instance two cells the upper and lower of which are designated at 12 and 13, respectively. These cells receive a weaving shuttle S and S', respectively, and pattern mechanism not shown but well understood determines the position of the cells with respect to the shuttle race 14. The boxes are supported by a box lifter rod 15 which may be connected to a box motion a part of which is indicated in Fig. 2 at 16. It is to be understood that the shuttles travel toward the drop boxes as the lay moves forwardly and are boxed ordinarily when the lay is slightly in front of the mid point of its forward stroke. Shifting of the boxes starts as soon as the point in the loom cycle is reached when the shuttle should be boxed, and shifting ordinarily continues until the lay has reached its mid point on the rearward stroke thereof, or at so-called top center, at which point the shuttle is picked. When the active shuttle is boxed its weft thread W leads from the front wall 20 of the shuttle S and therefore extends from the selvage diagonally forwardly and toward the shuttle boxes.

The parts thus far described are of common construction and operate in the usual way and of themselves form no part of my present invention, except as they move the weft thread to cooperate with the thread hook to be described.

In carrying my present invention into effect, I provide a plate 25 preferably made of pressed metal and held to the breast beam 10 by a bolt 26. The plate 25 is angularly adjustable around the bolt and the plate may also be moved in a direction longitudinally of the lay because of slot 27 formed therein through which the bolt passes. The rear and front edges of the plate as shown in Fig. 1 are upturned to form guide bearings 28 and 29 respectively, and these bearings are slotted as at 30 to receive an elongated flat hook member or arm 31 extending through the slots and lying close to the upper surface of the plate 25. The forward end of the member 31 projects sufficiently in front of guide 29 to receive a stud 32 fixed therein and having attached thereto the front end of a light tension spring 33 the rear end of which is attached to the rear bearing 28. The purpose of the spring is to hold the member 31 yieldingly in rear position as shown for instance in Fig. 1.

The rear end of hook arm 31 is bent up as at 35 to form a thread hook having the end thereof adjacent to the drop boxes inclined upwardly as at 36, see Fig. 5. The rear end of member 31 lies close to the shuttle race 14 as shown in Fig. 2 and the hook 35 faces forwardly and upwardly and is located at a point adjacent to the selvage 40 of the cloth being woven. Arm 31 may be provided with an offset 41 the extent of which is determined by the difference in heights between the shuttle race 14 and the top of the breast beam 10. A guard 45 rigid with the under side of arm 31 projects slightly behind the hook 35 for engagement with a misplaced shuttle.

In operation, the weft thread W will extend from the selvage toward the drop boxes on alternate forward beats of the lay and the weft thread W will be high enough because of the height of the shuttle eye E to move up over the hook to a position in front of the latter due to the fact that the hook is close to the reed R when the lay is on front center.

The shuttle will be boxed while the weft W is still behind the hook 35, but the thread will be higher than the hook. One of three conditions will then occur, namely, the active shuttle can shift down, or it can shift up, or as a third condition it can remain active.

If the shuttle boxes drop the thread W will be lowered and also move forwardly with the lay, and will either be in front of the hook 35 before getting down to it, or if down before reaching the hook will slide up over the latter as the lay advances. In either event the thread will be in front of the hook when the lay is on front center, and as the lay starts back the thread will be held forward, as shown in Fig. 4, to be out of the path of the shuttle next to be active.

If the shuttle boxes rise the thread will be above the hook, but during backward motion of the lay the thread will extend from the elevated box downwardly and toward the fell of the cloth C, in a diagonal direction in front of the path of the shuttle which is picked from the bottom box. On the next forward beat of the lay the thread W will be slackened and fall in front of hook 35, after which the latter will hold the thread as shown in Fig. 4, out of the path of the active shuttle.

In the third condition where the shuttle remains active the thread may fall in front of the hook, but as the shuttle travels through the shed the thread will clear itself from the hook by sliding along the inclined part 36 of the hook. This latter condition also occurs when an idle shuttle either rises or falls to active position after a period of inaction.

As shown in Fig. 1 the arm or hook member 31 is preferably disposed diagonally with respect to the lay and extends in such a direction that its left edge 50 near the shuttle boxes will be diagonally disposed rearwardly and toward the center of the loom. This angular disposition of the edge 50 enables the thread W to clear itself should it be caught around the edge 50 and extend under the arm 31. This latter condition will not ordinarily exist due to the fact that the arm 31 lies close to the shuttle race 14.

If for any reason the shuttle should be misplaced and fail to reach its drop box cell in the usual time the condition represented in Fig. 3 will result, where the front wall of the shuttle is shown as engaging the guard 45 to push the arm 31 forwardly against the yielding action of spring 33. The guard holds the hook proper out of engagement with the shuttle and this relation is desirable due to the fact that the hook is provided with a high degree of finish enabling it to cooperate with very fine yarns without breaking them. While this forward motion of the hook 35 creates a tension on the weft thread W the latter will ordinarily not break because enough thread can be fed from the shuttle eyes of the idle shuttles to provide sufficient slack to prevent thread breakage.

From the foregoing it will be seen that I have provided a simple form of thread holder to be located at the drop box end of the loom for the purpose of separating the threads extending from the idle shuttles to the adjacent selvage, thereby avoiding breakage by the active shuttle. It will further be seen that the hook is so formed as to be self clearing when the idle shuttle is restored to action and it will also be noted that the arm 31 is diagonally disposed to assist in this self clearing operation should the weft thread accidentally pass under the arm. It will also be seen that the spring 33 permits forward yielding of the arm 31 should it be struck by a misplaced shuttle and furthermore a guard 45 prevents the hook from having actual contact with the misplaced shuttle. Adjustments of the arm 31 angularly with respect to the lay and also in a direction of the length of the lay are provided by the bolt 26 and the slot 27.

Having thus described my invention it will be seen that changes and modifications may be made therein by those skilled in the art without departing from the spirit and scope of the invention and I do not wish to be limited to the details herein disclosed, but what I claim is:

1. In a loom having a breast beam and a lay movable toward and from the breast beam and having vertically shifting shuttle boxes at one end of the lay, a thread separator comprising a sheet metal plate secured to the breast beam and having upwardly extending slotted spaced walls, a sheet metal arm extending through the slotted walls and slidable therein with respect to the base, a spring interposed between the forward end of the arm and the base, and tending normally to hold the arm yieldingly in rearward position but yieldable when the arm is moved forwardly by a misplaced shuttle, and a thread hook integral with and projecting upwardly and forwardly from the rear end of the arm and positioned to lie under a thread extending from the cloth to a shuttle in the shifting shuttle boxes.

2. In a loom having a breast beam and a lay movable toward and from the breast beam and having vertically shifting shuttle boxes at one end of the lay, and a thread separator comprising a base fixed to the breast beam, an arm slidable on the base in a direction toward and from the lay and having an edge thereof adjacent the shuttle boxes inclined rearwardly from the breast beam and toward the center of the loom, a thread hook formed on the rear end of the arm positioned to lie under a thread extending from the cloth to a shuttle in the shifting boxes to the selvage, and a yielding connection between the base and the arm holding the latter and the hook normally rearwardly and yielding when the arm is moved forwardly by a misplaced shuttle.

3. In a loom having a breast beam and a lay movable toward and from the breast beam and having vertically shifting shuttle boxes at one end of the lay, a thread separator comprising a base formed of sheet metal secured to the breast beam between the cloth and the shifting shuttle boxes and having the front and rear edges thereof upturned and slotted, a sheet metal arm extending through the slotted upturned edges of the base and slidable forwardly and rearwardly with respect to the latter, yieldable means interposed between the forward ends of the arm and the rear upturned edge of the base to hold the arm yieldingly in rearward position, a thread hook formed integral with the rear end of the arm and extending upwardly and forwardly therefrom and being positioned to lie under a thread extending from the cloth to a shuttle in the shifting boxes when the lay moves forwardly, the edge of the arm adjacent the shifting shuttle boxes being inclined in a direction rearwardly from the breast beam and toward the center of the loom.

4. In a loom having a breast beam and a lay movable toward and from the breast beam and having vertically shifting shuttle boxes at one end of the lay, a thread separator comprising a base formed of sheet metal secured to the breast beam between the cloth and the shifting shuttle boxes and having the front and rear edges thereof upturned and slotted, a sheet metal arm extending through the slotted upturned edges of the base and slidable forwardly and rearwardly with respect to the latter, yieldable means interposed between the forward ends of the arm and the rear upturned edge of the base to hold the arm yieldingly in rearward position, a thread hook formed integral with the rear end of the arm and extending upwardly and forwardly therefrom and being positioned to lie under a thread extending from the cloth to a shuttle in the shifting boxes when the lay moves forwardly, the slotted parts of the upturned edges lying on a line extending diagonally rearwardly and toward the center of the loom and the arms having parallel sides inclined rearwardly from the breast beam and toward the center of the loom.

5. In a loom having a breast beam and a lay movable toward and from the breast beam and having vertically shifting shuttle boxes at one end of the lay, a thread separator comprising a base on the breast beam, a rearwardly extending arm slidably mounted on the base, a thread hook at the rear end of the arm extending upwardly and forwardly and positioned to lie under a thread extending from the cloth to a shuttle in the shifting boxes when the lay moves toward the breast beam, yielding means normally holding the arm and hook in rearward position and yielding when the arm is moved forwardly by engagement with a misplaced shuttle, and a shuttle engaging guard on the arm projecting rearwardly from the hook to have direct engagement with a misplaced shuttle to prevent the latter from engaging the hook.

6. In a loom having a breast beam and a lay movable toward and from the breast beam and having vertically shifting shuttle boxes at one end of the lay, a thread separator comprising a base formed of sheet metal secured to the breast beam between the cloth and the shifting shuttle boxes and having the front and rear edges thereof upturned and slotted, a sheet metal arm extending through the slotted upturned edges of the base and slidable forwardly and rearwardly with respect to the latter, yieldable means interposed between the forward ends of the arm and the rear upturned edge of the base to hold the arm yieldingly in rearward position, a thread hook formed integral with the rear end of the arm and extending upwardly and forwardly therefrom and being positioned to lie under a thread extending from the cloth to a shuttle in the shifting boxes when the lay moves forwardly, and a hook guard rigid with the rear end of the arm and projecting to a point behind the rearmost part of the hook to be engaged by a misplaced shuttle as the lay moves forwardly to move the arm forwardly against the action of the yielding means and keep the shuttle out of contact with the hook.

7. In a loom having a breast beam and a lay movable toward and from the breast beam and having vertically shifting shuttle boxes at one end of the lay, a thread separator comprising a base secured to the breast beam, an arm slidable backwardly and forwardly in the base, a stop on the arm to engage a portion of the base behind said stop to limit rearward motion of the arm with respect to the base, yielding means to hold the arm normally in rear position with the stop against said portion of the base, said yielding means yielding when the arm is moved forwardly with respect to the base by a misplaced shuttle, and a thread hook carried by the rear end of the arm and extending upwardly and forwardly and positioned to lie under a thread extending from the cloth to a shuttle in the shifting shuttle boxes as the lay moves toward the breast beam.

8. In a loom having a breast beam and a lay movable toward and from the breast beam and having vertically shifting shuttle boxes at one end of the lay, a thread separator comprising a sheet metal base having front and back upturned slotted edges, an arm extending through the slotted upturned edges and extending rearwardly from and being slidable with respect to the base, a stop stud on the forward part of the arm in front of the upturned edge of the base, a spring interposed between the stud and the rear upturned edge of the base tending to hold the arm yieldingly in rearward position with the stud in contact with the front upturned edge of the base, and an upwardly extending forwardly inclined thread hook integral with the rear end of the arm and positioned to lie under a thread extending from the cloth to the shifting shuttle boxes when the lay moves toward the breast beam, the arm and hook being slidable forwardly against the action of the spring when engaged by a misplaced shuttle during forward motion of the lay.

9. In a loom having a breast beam and a lay movable toward and from the breast beam and having vertically shifting shuttle boxes at one end of the lay, a thread separator comprising a base on the breast beam, a rearwardly extending arm slidably mounted on the base, a thread hook formed at the rear end of the slidable arm positioned to lie under a thread extending from the selvage to a shuttle in the shifting boxes, yielding means for holding the arm and hook normally in rear position and against the action of which the arm and hook are movable forwardly with respect to the base by a misplaced shuttle, and means to secure the base to the breast beam in any one of a plurality of angular positions to vary the location of the thread hook with respect to the cloth selvage.

10. In a loom having a breast beam and a lay movable toward and from the breast beam and having vertically shifting shuttle boxes at one end of the lay, a thread separator comprising a sheet metal base on the breast beam between the cloth and the shifting shuttle boxes and having the front and rear edges thereof upturned and slotted, a sheet metal arm extending through the slotted upturned edges of the base and slidable forwardly and rearwardly with respect to the latter, yieldable means interposed between the forward ends of the arm and the rear upturned edge of the base to hold the arm yieldingly in rearward position, a thread hook formed integral with the rear end of the arm and extending upwardly and forwardly therefrom and being positioned to lie under a thread extending from the cloth to a shuttle in the shifting boxes when the lay moves forwardly, the base having a slot therein having a component extending in the direction of the length of the breast beam, and securing means extending through the slot and into the breast beam to hold the base in any one of a plurality of positions on the breast beam at different distances from the cloth selvage.

RICHARD G. TURNER.